3,200,102
PROCESS FOR THE PRODUCTION OF HYDROLYZED ACRYLONITRILE POLYMERS
Helmut Kleiner, Cologne-Stammheim, Germany, assignor to Farbenfabriken Bayer Aktiengesellschaft, Leverkusen, Germany, a German corporation
No Drawing. Filed Aug. 14, 1962, Ser. No. 216,719
Claims priority, application Germany, Sept. 6, 1961,
F 34,867
2 Claims. (Cl. 260—88.7)

The present invention relates to a process for the production of polyacrylic acid derivatives which are soluble or swellable in water.

It has been found that technically valuable polyacrylic acid derivatives or their substitution products which are soluble or swellable in water can be obtained by heating polymers of acrylonitrile or copolymers or graft polymers with a predominant proportion of acrylonitrile to relatively high temperatures, i.e. to at least 180° C., preferably under pressure, in aqueous suspension, dispersion or emulsion, if desired in the presence of inert gases.

The hydrolyzates obtained according to the invention are different from the saponification products which are so far known in the literature and are obtained by the use of alkalis or acids, by the fact that they contain both carbonamide groups and carboxylic acid groups in the form of their ammonium salts, generally in the ratio of about 1:1. Consequently, they have on the one hand the properties of polyacrylic acid amide, for example, the capacity for forming methylol derivatives and for undergoing cross-linking with formaldehyde or with polyfunctional compounds, but on the other hand they have an acid function, i.e. they can form sparingly soluble salts with suitable heavy metals or they can form salts with readily volatile bases which salts are easily decomposed. In addition, they may be esterified with alcohols.

By comparison with the known processes, which are carried out using alkalis or acids followed by subsequent neutralization, the process according to the invention has the advantage that the hydrolysis products can be obtained practically free from electrolytes without special purification.

It is known that it is difficult to produce a copolymer of acrylamide and acrylic acid in the ratio 1:1 by polymerization of acrylamide and acrylic acid in aqueous solution, because in this case cross-linking reactions readily occur. Generally speaking, the hydrolysis of the polyacrylonitrile according to the present process is carried out until no more nitrile groups can be detected in the hydrolyzate. By temporarily breaking off the reaction, it is however possible to obtain jelly-like intermediate products which are highly swellable in water and which can be considered for special technical purposes.

In carrying out the process, polyacrylonitrile powder is simply suspended in water, which can also be free from electrolyte. In principle very different water-polymer ratios may be used, however only water-polymer respectively copolymer ratios between 10:1 and 1:1 and preferably between 6:1 and 3:1 have been proved to be of technical interest. The suspension is then heated in a stirrer-type autoclave for some time to relatively high temperature. The powder can be in a coarsely dispersed form, but the finer it is ground, the more quickly is hydrolysis complete. Known dispersing or emulsifying agents may be used for producing the suspension. The temperature is advantageously raised to about 180 to 220° C. The reaction period for a molar mixture is about four to six hours. The process can of course also be carried out continuously, both without pressure or with superheated steam. Furthermore it is possible to carry out the hydrolysis in the presence of catalytic quantities (0.1 up to 3% calculated on polymer) of toluene-sulphonic acid and the like. Viscous clear solutions are obtained which can be directly employed for technical purposes. The hydrolyzates can also however be isolated by spray-drying, by concentration by evaporation or by precipitation with strong acids. They constitute brittle, water-soluble, slightly colored resins. In order to restrict discoloration to a minimum, the hydrolysis can be carried out in the presence of inert gases, for example nitrogen. The products obtainable according to the process are suitable as thickeners, suspension agents, sizing agents or binders. They can if required be converted by the use of polyfunctional agents, for example formaldehyde, into water-insoluble products.

The term polyacrylonitrile is intended to cover also its substitution products, especially $\alpha$-substitution products such as methacrylonitrile, $\alpha$-chloracrylonitrile, $\alpha$-cyanacrylonitrile and the like. The term "polymer of acrylonitrile or copolymer or graft polymer with a predominant proportion of acrylonitrile" is intended to cover homopolymers of acrylonitrile or its $\alpha$-substitution products as well as copolymers or graft polymers of these monomers having a content of copolymerized acrylonitrile of at least 60% and preferably 90% by weight.

Particularly suitable as components in the copolymers are those which themselves give water-soluble hydrolyzates, for example acrylic acid and methacrylic acid, the esters of acrylic acid and methacrylic acid preferably with lower aliphatic saturated or cyclo-aliphatic alcohols (having from 1 to 6 carbon atoms), the esters or semi-esters of maleic and fumaric acid with alcohols of the aforementioned type, vinyl esters derived from lower aliphatic saturated monocarboxylic acids, preferably those having from 2 to 4 carbon atoms such as vinyl acetate, vinyl propionate and vinyl butyrate (with which particular effects may be obtained on saponification) vinyl ethers, vinyl sulphonic acid and vinyl pyrrolidone. Conjugated aliphatic diolefines having from 4 to 6 carbon atoms such as butadiene as well as specific other monomers such as vinyl succinimide may also be used to a certain extent as copolymer components.

*Example 1*

1 mol=53 g. of polyacrylonitrile powder with a K-value [1] of 91 are suspended with 300 ml. of water in a stirrer-type autoclave with a capacity of 0.7 liter and heated with stirring for four hours to 200° C., a pressure about 10 atmospheres resulting. After cooling and opening the autoclave, the contents are found to have changed into a viscous homogeneous solution, which has a weak ammoniacal reaction. It has a solid content of about 22%. The reaction product is isolated by spray-drying or concentration by evaporation. It is obtained in the form of a brittle, slightly brownish resin, which may be redissolved in water to give a clear viscous solution. Analysis shows that the polymer chain consists of approximately equal parts of amide and ammonium salt groups. It is no longer possible to detect nitrile groups by infra-red spectography. The product has a specific viscosity of $[\eta]=0.535$ and a K-value of about 50 (in 2 N NaNO₃ solution). It can be precipitated from solutions by strong mineral acids or strong organic acids. Both in solution and on a support, it can be cross-linked with bifunctional or polyfunctional compounds, for example with formaldehyde in the presence of acid.

*Example 2*

If polyacrylonitrile powder is heated in the manner indicated in Example 1 for only about 2 hours to 200°

---
[1] See Fickentscher, Cellulosechemie 13 (1932), page 60.

instead of four hours, the contents of the autoclave consists of a swelled mass which is no longer soluble, like the initial material, in dimethylformamide, but swells very strongly in water. It can be used as a swelling or thickening agent.

*Example 3*

2 mols=106 g. of polyacrylonitrile powder are heated with 300 ml. of water for 6 hours at 200° in an autoclave which has been flushed with nitrogen and then filled with nitrogen. A very viscous, substantially 40% clear solution which is only slightly colored is obtained. The composition, the K-value and the other properties correspond to those of the product obtained according to Example 1, except that the films cast from this material are practically colorless.

*Example 4*

1 mol=53 g. of polyacrylonitrile powder with a K-value of 90 are heated with 300 ml. of water for six hours to 200° in a stirrer-type autoclave which has been flushed out with $CO_2$ and filled with $CO_2$. A viscous, somewhat cloudy and practically colorless solution is formed, the solution having a pH value of 7.3. The solids content is 23.5. The reaction product obtained constitutes a brittle, almost colorless, water-soluble resin. Its K-value is 52.4, the specific viscosity $[\eta]=0.6146$ (in 2 N $NaNO_3$ solution). According to analysis, about 1.7–1.8 ammonium salt groups are present per one amide group. The solution swells readily when formaldehyde and some acetic acid are added.

*Example 5*

53 g. of a copolymer of acrylonitrile and methylacrylate (2%) are heated in the manner described above with 300 ml. of water for six hours at 200°. A clear viscous solution is again obtained. The hydrolyzate contains more acid groups the more ester fractions are incorporated by polymerization.

*Example 6*

100 g. of a copolymer of 80 parts of acrylonitrile and 20 parts of methacrylonitrile are heated with 300 g. of water for eight hours to 200° in a stirrer-type autoclave charged with nitrogen. A practically colorless viscous clear aqueous solution is obtained. The hydrolyzate, a brittle almost colorless resin, contains about two acid groups in the form of the ammonium salt to one amide group.

Depending on the reaction time it is possible in the foregoing examples to use other hydrolyzation temperatures, i.e. between 180° C. and 220° C. without any disadvantage.

I claim:

1. A process for the production of a hydrolyzed polymer of acrylonitrile which comprises heating to a temperature of about 180–220° C. over a period of 4 to 6 hours a polymer of acrylonitrile which contains at least 60% by weight of polymerized acrylonitrile, said polymer of acrylonitrile being dispersed in water in a ratio of water to polymer of between 10:1 and 1:1, and recovering a hydrolyzed polymer of acrylonitrile containing carbonamide groups and carboxylic acid groups in the form of their ammonium salts in a ratio of about 1:1.

2. The process of claim 1 wherein said polymer of acrylonitrile is polyacrylonitrile.

References Cited by the Examiner

UNITED STATES PATENTS 2,982,760   5/61   Maragliano et al. _____ 260—88.7

OTHER REFERENCES

Cyanamide, The Chemistry of Acrylonitrile, copyright by American Cyanamid Co. (1959), p. 11.

JOSEPH L. SCHOFER, *Primary Examiner.*

LEON J. BERCOVITZ, *Examiner.*